(12) United States Patent
Johnson

(10) Patent No.: US 10,948,650 B2
(45) Date of Patent: Mar. 16, 2021

(54) DISPLAY INCLUDING TURNING FILM AND DIFFUSER

(71) Applicant: 3M INNOVATIVE PROPERTIES COMPANY, St. Paul, MN (US)

(72) Inventor: Nicholas A. Johnson, Burnsville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/752,536

(22) PCT Filed: Aug. 10, 2016

(86) PCT No.: PCT/US2016/046397
§ 371 (c)(1),
(2) Date: Feb. 13, 2018

(87) PCT Pub. No.: WO2017/027618
PCT Pub. Date: Feb. 16, 2017

(65) Prior Publication Data
US 2019/0011630 A1    Jan. 10, 2019

Related U.S. Application Data

(60) Provisional application No. 62/204,810, filed on Aug. 13, 2015.

(51) Int. Cl.
G02F 1/13357   (2006.01)
F21V 8/00      (2006.01)
G02F 1/1335    (2006.01)

(52) U.S. Cl.
CPC ......... G02B 6/0053 (2013.01); G02B 6/0051 (2013.01); G02B 6/0088 (2013.01);
(Continued)

(58) Field of Classification Search
CPC ................ G02B 6/0053; G02F 1/133504
See application file for complete search history.

(56) References Cited

U.S. PATENT DOCUMENTS 6,002,829 A * 12/1999 Winston ............ G02B 6/0038
                                                    385/146
8,059,229 B2    11/2011 Shinkai
(Continued)

FOREIGN PATENT DOCUMENTS

JP    2002-109925    4/2002
JP    2005-38863     2/2005
(Continued)

OTHER PUBLICATIONS

International Search report for PCT International Application No. PCT/US2016/046397 dated Nov. 1, 2016, 4 pages.

*Primary Examiner* — Andrew J Coughlin
(74) *Attorney, Agent, or Firm* — Michael Stern

(57) ABSTRACT

Displays having a viewing area are described. In particular, displays including a lightguide, a turning film, a liquid crystal module including two polarizers, and a diffuser disposed proximate the top polarizer are described. Light extracted from the lightguide and emitted through the viewing area is specularly transmitted between the planar side of the turning film and the bottom absorbing polarizer. Displays that may be useful as switchable displays are described.

17 Claims, 2 Drawing Sheets

(52) U.S. Cl.
CPC .............. *G02F 1/133504* (2013.01); *G02F 2001/133562* (2013.01)

(56) References Cited

U.S. PATENT DOCUMENTS

| | | | |
|---|---|---|---|
| 8,576,357 | B2 | 11/2013 | Gehlsen et al. |
| 2002/0005991 | A1* | 1/2002 | Masaki ............... G02B 5/0221 359/599 |
| 2002/0102087 | A1* | 8/2002 | Ohkawa ............... G02B 6/0031 385/129 |
| 2004/0066645 | A1* | 4/2004 | Graf ....................... C08L 69/00 362/629 |
| 2005/0094295 | A1* | 5/2005 | Yamashita ............ G02B 5/045 359/833 |
| 2005/0185423 | A1* | 8/2005 | Miyashita ............ G02B 6/0038 362/620 |
| 2005/0206814 | A1 | 9/2005 | Histake |
| 2005/0237749 | A1* | 10/2005 | Epstein ................. G02B 5/021 362/330 |
| 2005/0248960 | A1* | 11/2005 | Yamashita ............ G02B 5/30 362/611 |
| 2007/0019434 | A1* | 1/2007 | Lee ..................... G02B 6/0053 362/606 |
| 2007/0236938 | A1* | 10/2007 | Ouderkirk ........... G02B 5/0236 362/339 |
| 2007/0279352 | A1 | 12/2007 | Tanaka |
| 2009/0027591 | A1 | 1/2009 | Hwang |
| 2009/0201571 | A1* | 8/2009 | Gally .................. G02B 6/0041 359/315 |
| 2010/0302807 | A1 | 12/2010 | Mi |
| 2014/0140091 | A1* | 5/2014 | Vasylyev ............... G02B 6/001 362/606 |
| 2015/0301384 | A1* | 10/2015 | Koike .................. G02B 6/0053 349/65 |

FOREIGN PATENT DOCUMENTS

| | | |
|---|---|---|
| JP | 2013-3266 | 1/2011 |
| JP | 2014-135120 | 7/2014 |
| JP | 2015-28523 | 2/2015 |
| KR | 10-2015-0035636 | 4/2015 |
| WO | WO 1998-33006 | 7/1998 |
| WO | WO 2007/117935 A2 | 10/2007 |
| WO | WO 12147646 | 1/2012 |

* cited by examiner

DISPLAY INCLUDING TURNING FILM AND DIFFUSER

BACKGROUND

Displays typically include some level of diffusion in the backlight in order to hide cosmetic defects and damage in the lightguide and other backlight components. Turning films redirect light from an input range of angles to an output range of angles, through reflection, refraction, or a combination thereof.

SUMMARY

In one aspect, the present disclosure relates to a display having a viewing area. The display includes a lightguide, a turning film disposed proximate the lightguide having a prism side and a planar side where the prism side faces the lightguide, a liquid crystal module disposed proximate the turning film, the liquid crystal module including a bottom absorbing polarizer and a top absorbing polarizer, the liquid crystal module oriented such that the bottom absorbing polarizer is proximate the turning film, and a diffuser disposed proximate the top absorbing polarizer. Light extracted from the lightguide and emitted through the viewing area is specularly transmitted between the lightguide and the prism side of the turning film. Light extracted from the lightguide and emitted through the viewing area is specularly transmitted between the planar side of the turning film and the bottom absorbing polarizer. The planar side of the turning film is optically smooth.

In another aspect, the present disclosure relates to a display having a viewing area. The display includes a lightguide, a turning film disposed proximate the lightguide having a prism side and a planar side where the prism side faces the lightguide, a liquid crystal module disposed proximate the turning film, the liquid crystal module including a bottom absorbing polarizer and a top absorbing polarizer, the liquid crystal module oriented such that the bottom absorbing polarizer is proximate the turning film, and a diffuser disposed proximate the top absorbing polarizer. Light extracted from the lightguide and emitted through the viewing area is specularly transmitted between the planar side of the turning film and the bottom absorbing polarizer.

DETAILED DESCRIPTION

Figure 1:
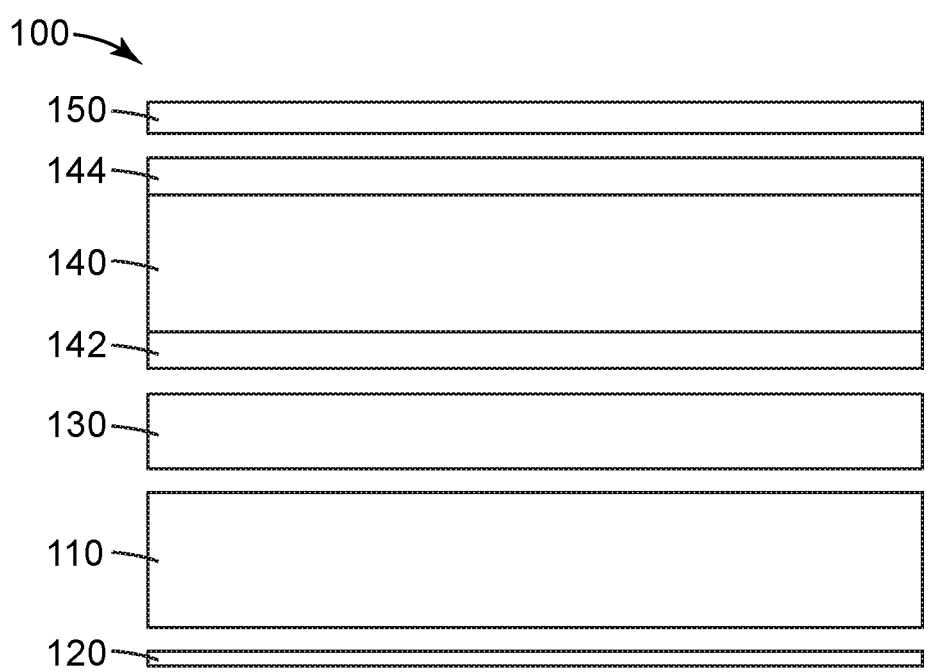
FIG. 1 is an elevation cross-section of a display.

FIG. 1 is an elevation cross-section of a display. Display 100 includes lightguide 110, back reflector 120, turning film 130, liquid crystal module 140 including bottom absorbing polarizer 142 and top absorbing polarizer 144, and diffuser 150. As display 100 includes a liquid crystal layer, it may be referred to or considered a liquid crystal display, or LCD display.

Lightguide 110 may be any suitable material, shape or size. In some embodiments, lightguide 110 may be acrylic, which may be advantageously injection molded. In some embodiments, lightguide 110 may be or include another polymer. In some embodiments, lightguide 110 may be a flexible or film lightguide. Lightguide 110 may include any suitable number, shape, and size of extraction features, including, for example, bumps, painted dots, or indentations. The arrangement and configuration of the extractors may be chosen to provide an overall spatially uniform light output from light injected into one or more sides of the lightguide.

In some embodiments, lightguide 110 may be substantially flat; i.e., it may include a central waveguiding portion that has near constant thickness. For example, the center 50%, 70%, or 90% of the lightguide may have a thickness that does not vary more than 10%, or 5%, or even 1%. In some embodiments, lightguide 110 may be wedge shaped, and light may be extracted through being forced into increasing and eventually supercritical incidence angles vis-à-vis the top or bottom surface.

Back reflector 120 is disposed behind or below lightguide 110 (i.e., on the opposite side of lightguide 110 from other display components). Back reflector 120 may be any reflective material or layer. In some embodiments, back reflector 120 is a polymeric multilayer optical film, such as Enhanced Specular Reflector (ESR) (available from 3M Company, St. Paul, Minn.). In some embodiments, back reflector 120 is a diffuse or Lambertian reflector, such as a white reflector, a specular reflector, such as ESR, or a semi-specular reflector, having somewhere between Lambertian and specular reflectivity characteristics. Back reflector 120 helps minimize the loss of light though the non-viewing side of the display by reflecting it back toward the other components.

Back reflector 120 may be laminated to lightguide 110 with the aid of an adhesive or back reflector 120 may be free-floating; i.e., may not be adhered but instead simply be disposed next to or proximate lightguide 110.

Turning film 130 may be any suitable thickness and may be made from any suitable material. In some embodiments, turning film 130 will be formed from a polymeric material, such as polycarbonate, polyethylene terephthalate, polyethylene naphthalate, poly(methyl methacrylate) and copolymers and blends of the same. In some embodiments, turning film 130 may be optically transparent or have low haze and high clarity to avoid undesirably scattering incident light. In some embodiments, the turning film may have a sufficiently high index of refraction, such as 1.5 or greater, to ensure that total internal reflection occurs at a sufficiently broad range of angles. Other appropriate materials include acrylics, polystyrenes, methyl styrenes, acrylates, polypropylenes, polyvinyl chlorides, and the like. In some embodiments the material, dimensions, or both of turning film 130 may be selected in order to produce a flexible film.

In some embodiments, the top surface of turning film 130 is, planar, meaning substantially smooth, or optically smooth. However, the top surface need not be completely smooth in all embodiments, and may qualify as a substantially smooth surface as long as the surface does not contain microstructures (or a structured surface diffuser). For example, an anti-wetout or anti-glare beaded coating may be included or incorporated on the top surface of the turning film, and such a surface may still be considered substantially smooth or optically smooth for the purposes of this descipttion. Manufacturing defects may also be unavoidable, unnoticeable for practical purposes, or difficult to control in many embodiments, and these should not be understood to disqualify such a surface from being optically smooth.

In some embodiments, the bottom surface of turning film 130 (facing lightguide 120) is a structured side or prism side including microstructures. Each of these microstructures may be linear microstructures; that is, the microstructures may extend along a direction with substantially the same or identically the same cross-sectional shape. The microstructures, and more generally, the structured surface of turning film 130 may be formed through any suitable process, such as a microreplication process. For example, the structured surface may be formed through cutting (fly cutting, thread cutting, diamond turning or the like) a suitable tool with the negative of the desired structure and pressing a compliant but curable or hardenable material against the tool surface. The material may be subsequently hardened or cured (for example, through exposure to light such as ultraviolet light), leaving the prism side with the desired features. Other processes may be possible, including casting and curing with an electroplated, laser cut, or etched tool, using photolithography such as two-photon mastering of a tool in conjunction with a cast and cure process, or even direct machining or an additive three-dimensional printing process.

The microstructures of the turning film may all be the same or they may different. In some embodiments, microstructures of two or more types alternate or vary in a pattern or without a discernable pattern. Each of the microstructures may have a first face and a second face. In some embodiments, the first and second faces make a first and second angle with the plane of the planar side, and these angles may be different. In some embodiments, the first and second faces have different shapes; for example, one may be curved and one may be flat or linear from a cross-sectional view. The overall arrangement of the microstructures on the bottom surface may have any suitable pitch and may or may not have land (flat areas) between microstructures. The microstructures may be any appropriate size, and in many cases may be on the millimeter or micrometer scale, in some cases between 10 and 100 micrometers or between 10 and 300 micrometers. The pitch or size of microfeatures may increase, decrease, both increase and decrease, or remain constant for all or portions of the bottom structured surface. The microstructures may also change shape, size, rotation, or pitch along one or more portions of turning film 130. In some embodiments, the microstructures are spatially variant, and in some embodiments there may be discrete portions of the microstructures having similar characteristics, but different characteristics from neighboring portions of turning film 130.

Light emitted from lightguide 120 is specularly transmitted between the lightguide and the prism side of turning film 130. Specularly transmitted, as used herein, means that along the path of specular transmission there are no diffusers or other scattering component, either of bulk or surface type. For example, an optically clear adhesive may be used if it is non-diffusing and non-scattering. Non-diffusing and non-scattering may be characterized as less than 5% haze, or less than 1% haze.

Liquid crystal module 140 includes bottom absorbing polarizer 142 and top absorbing polarizer 144. The liquid crystal module can include any type of liquid crystal layer, including twisted nematic, super-twisted nematic, IPS (in-plane switching), or others. The absorbing polarizers may be any suitable absorbing polarizer layer including polarizing elements (such as iodine dyes) in polyvinyl alcohol (PVA) with one or more triacetate (cellulose triacetate or TAC) as a protective layer. In some embodiments, turning film 130 may be laminated or adhered to the bottom polarizer of liquid crystal module 140.

Light emitted from lightguide 120 is specularly transmitted between the top surface of turning film 130 (i.e., the surface nearest the liquid crystal module) and bottom absorbing polarizer 142. As before, specularly transmitted means that along the path of specular transmission there are no diffusers or other scattering component, either of bulk or surface type.

Diffuser 150 may be any suitable diffuser. In some embodiments, diffuser 150 is a bulk or volume diffuser. As a volume or bulk diffuser, diffuser 150 may include beads or an immiscible blend of materials with different refractive indices. In some embodiments, diffuser 150 is a surface diffuser. As a surface diffuser, diffuser 150 may have one or both of its major surfaces microstructured or microtextured. In some embodiments, diffuser 150 may have a structured top surface. In some embodiments, diffuser 150 may have a structured bottom surface. In some embodiments, diffuser 150 may have a structured top and bottom surface. The microstructured surface may be created through any suitable process, including microreplication (i.e., a cast-and-cure process or similar, with any suitable process being used to create the mold or tool), additive manufacturing such as a 3D printing process, or even injection molding.

Diffuser 150 may have any suitable haze and clarity. In some embodiments, diffuser 150 has a haze greater than 35%, 40%, 50%, 60%, 70%, 80%, or even 90% or 95%.

In some embodiments, diffuser 150 is a switchable diffuser. Switchable diffusers include materials such as polymer dispersed liquid crystal (PDLC) and smectic-A liquid crystal (SmA) that respond to voltages applied across the diffuser by changing haze states. For example, a switchable diffuser may change from a hazy state to a clear state or vice versa by the application or removal of a voltage differential (e.g., for PDLC materials) or with the application of a specific waveform (e.g., for SmA materials). In some embodiments, the switchable diffuser may be bistable, meaning it can maintain both a hazy and a clear state for a long duration without needing to be constantly powered. The specific duration considered to be long depends on the application, but may be on the order of several minutes, hours, days, months, or even years.

Diffusers are included in backlights (further from the viewer than the liquid crystal module) in order to hide defects that can have effects on the uniformity of the illumination, creating, for example, hot spots. These films are free floating, as lamination to other components in the backlight either wets out the diffusion properties (e.g., for the case of surface diffusers or even bulk diffusers with surface protrusions from beads) or defeats properties of adjacent films such as by overextracting light from a lightguide or by wetting out prisms on a turning film so that they do not have their desired optical effect. Even if certain surfaces are laminated to one another, the backlight unit itself (i.e., everything behind the liquid crystal module) is generally delivered as a standalone, uniform illumination unit by the backlight maker to the panel maker, so that at least the top and bottom surfaces are free floating. At the same time, free floating films necessarily have one or two Fresnel reflection interfaces that can create unwanted off-axis light in a highly input-angle-sensitive turning film backlight. Further complicating the situation is that, as described above, removing the diffuser from the backlight was generally thought unacceptable because of cosmetic defects inevitably inherent and visible in a diffuser-less backlight.

Surprisingly, disposing a diffuser not in the backlight but rather on the top polarizer of a liquid crystal module in a display can provide unexpected advantageous effects by reducing brightness at unwanted angles while still providing a cosmetically acceptable uniform illumination. Diffusion outside of the backlight also takes advantage of the absorbing polarizers and LCM (including the absorbing color filters) in order to control any back scattered light off the diffuser, such that such light is not recycled and does not end up as high-angle light. Displays described herein may be useful as switchable displays, where narrow and wide angle viewing may be selected, for example, depending on the ambient environment or through input by a user. The good (low) off-axis brightness may be useful in private or narrow viewing modes (such as sunlight readability modes) to prevent unwanted off-axis light.

EXAMPLES

Figure 2:
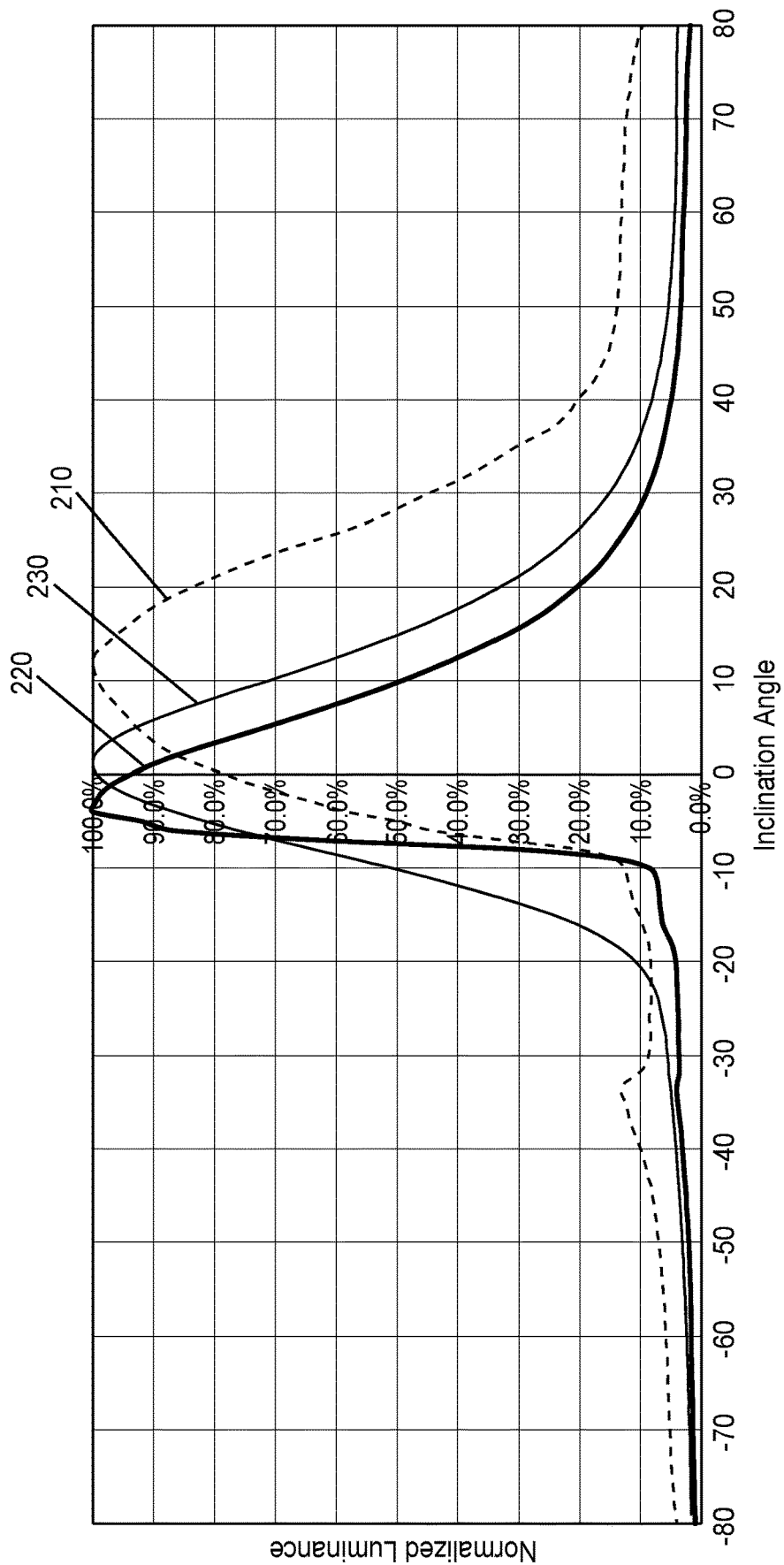
FIG. 2 is a graph showing normalized luminance versus inclination angle for an example and several comparative examples.

A commercially-available backlight from a SONY VAIO PCG-4G1L notebook computer (available from Sony Inc., Tokyo, Japan) was removed. All components in the existing backlight were removed from the chassis and set aside. The existing LED flex circuit attached to the LCD was covered with electrical tape. The back reflector was replaced with Enhanced Specular Reflector (ESR) (available from 3M Company, St. Paul, Minn.) and two wedge light guides were placed on top of each other on top of the ESR. A strip of LEDs were attached to the launch edge of each light guide to have an edge lit light guide on either side of the backlight. These LEDs were wired to an external power source through a switch, so either light guide could be illuminated separately. A turning film was laminated using 3M 8146-1 Optically Clear Adhesive (OCA) (available from 3M Company, St. Paul, Minn.) to the rear polarizer of the LCD. The turning film had 42 µm tall linear prisms arranged at a 50 µm pitch, each having a flat and a curved face. From the edge of the turning film corresponding to the launch edge across the film the prisms are rotated about their peak at a rate of 0.345 degrees/cm as pitch is held constant. (However, a standard symmetrical turning film having two flat faces would have produced similar results.) An 80% haze surface diffuser film was placed between the top light guide and the turning film in the backlight. With only the top light guide illuminated, the luminance versus view angle was measured by a WESTAR FPM-520 Display Optical Measurement System (available from Westar Display Technologies, St. Charles, Mo.) using a PR-705 SPECTRASCAN spectroradiometer (available from Photo Research, Inc., Chatsworth, Calif.). The luminance was normalized as a percentage of the maximum value measured. This is shown as curve 210 in FIG. 2.

Next, the diffuser film was removed from the backlight. The light guides and reflector combination was placed back in the chassis and measured as before. The normalized luminance is shown as curve 220 in FIG. 2.

Next, the same 80% haze diffuser film was laminated onto the front polarizer using 3M 8146-1 Optically Clear Adhesive (OCA). The light guides and reflector combination was placed back in the chassis and measured as before. The normalized luminance is shown as curve 230 in FIG. 2.

Off-axis brightness values were calculated for the various luminance distributions. Left and right off-axis brightness values are given by the averaged luminance less than −35 degrees for left off-axis brightness and greater than +35 degrees for right off-axis brightness, each divided by the maximum luminance. For curve 210, left off-axis brightness was 14.7% and right off-axis brightness was 6.8%. For curve 220, left off-axis brightness was 3.3% and right off-axis brightness was 1.9%. For curve 230, left off-axis brightness was 5.4% and right off-axis brightness was 2.8%.

The following are exemplary embodiments according to the present disclosure:

Item 1. A display having a viewing area, comprising:
 a lightguide;
 a turning film disposed proximate the lightguide having a prism side and a planar side, the prism side facing the lightguide;
 a liquid crystal module disposed proximate the turning film, the liquid crystal module including a bottom absorbing polarizer and a top absorbing polarizer, the liquid crystal module oriented such that the bottom absorbing polarizer is proximate the turning film; and
 a diffuser disposed proximate the top absorbing polarizer;
 wherein light extracted from the lightguide and emitted through the viewing area is specularly transmitted between the lightguide and the prism side of the turning film;
 wherein light extracted from the lightguide and emitted through the viewing area, is specularly transmitted between the planar side of the turning film and the bottom absorbing polarizer;
 and wherein the planar side of the turning film is optically smooth.

Item 2. The display of item 1, wherein the prism side of the turning film includes a plurality of microstructures, each microstructure in the plurality of microstructures having at least a first side and a second side making a first angle and a second angle, respectively, with a plane of the planar side, and wherein the first angle and second angles are different.

Item 3. The display of item 1, wherein the prism side of the turning film includes a plurality of microstructures, each microstructure in the plurality of microstructures having at least a first side and a second side, wherein one but not both of the first side and the second side includes a curved facet.

Item 4. The display of item 1, wherein the diffuser is a bulk diffuser.

Item 5. The display of item 1, wherein the diffuser is a surface diffuser.

Item 6. The display of item 5, wherein the surface diffuser includes a microreplicated surface.

Item 7. The display of item 1, wherein the diffuser has at least 35% haze.

Item 8. The display of item 1, wherein the diffuser has at least 70% haze.

Item 9. The display of item 1, wherein the diffuser has at least 80% haze.

Item 10. The display of item 1, wherein the diffuser is laminated to the top absorbing polarizer.

Item 11. A switchable display, comprising the display of item 1.

Item 12. A display having a viewing area, comprising:
 a lightguide;
 a turning film disposed proximate the lightguide having a prism side and a planar side, the prism side facing the lightguide;
 a liquid crystal module disposed proximate the turning film, the liquid crystal module including a bottom absorbing polarizer and a top absorbing polarizer, the liquid crystal module oriented such that the bottom absorbing polarizer is proximate the turning film; and
 a diffuser disposed proximate the top absorbing polarizer;
 wherein light extracted from the lightguide and emitted through the viewing area is specularly transmitted between the planar side of the turning film and the bottom absorbing polarizer.

Item 13. The display of item 12, wherein the planar side of the turning film is optically smooth.

Item 14. The display of item 12, wherein the diffuser is a bulk diffuser.
Item 15. The display of item 12, wherein the diffuser is a surface diffuser.
Item 16. The display of item 15, wherein the surface diffuser includes a microreplicated surface.
Item 17. The display of item 12, wherein the diffuser has at least 35% haze.
Item 18. The display of item 12, wherein the diffuser has at least 70% haze.
Item 19. The display of item 12, wherein the diffuser has at least 80% haze.
Item 20. A switchable display, comprising the display of item 12.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A display having a viewing area, comprising:
   a lightguide;
   a turning film disposed proximate the lightguide having a prism side and a planar side, the prism side facing the lightguide, and the prism side including a plurality of microstructures;
   a liquid crystal module disposed proximate the turning film, the liquid crystal module including a bottom absorbing polarizer and a top absorbing polarizer, the liquid crystal module oriented such that the bottom absorbing polarizer is proximate the turning film; and
   a diffuser disposed proximate the top absorbing polarizer, the diffuser being non-integral with the top absorbing polarizer;
   wherein light extracted from the lightguide and emitted through the viewing area is specularly transmitted between the planar side of the turning film and the bottom absorbing polarizer; and
   wherein the turning film is laminated or adhered to the bottom absorbing polarizer.

2. The display of claim 1, wherein the planar side of the turning film is optically smooth.

3. The display of claim 1, wherein the diffuser is a bulk diffuser.

4. The display of claim 1, wherein the diffuser is a surface diffuser.

5. The display of claim 4, wherein the surface diffuser includes a microreplicated surface.

6. The display of claim 1, wherein the diffuser has at least 35% haze.

7. The display of claim 1, wherein the diffuser has at least 80% haze.

8. A switchable display, comprising the display of claim 1.

9. A display having a viewing area, comprising:
   a lightguide;
   a turning film disposed proximate the lightguide having a prism side and a planar side, the prism side facing the lightguide, and the prism side including a plurality of microstructures, at least two of the plurality of microstructures having different rotational orientations relative to the turning film;
   a liquid crystal module disposed proximate the turning film, the liquid crystal module including a bottom absorbing polarizer and a top absorbing polarizer, the liquid crystal module oriented such that the bottom absorbing polarizer is proximate the turning film; and
   a diffuser disposed proximate the top absorbing polarizer, the diffuser being non-integral with the top absorbing polarizer;
   wherein light extracted from the lightguide and emitted through the viewing area is specularly transmitted between the lightguide and the prism side of the turning film;
   wherein the turning film is laminated or adhered to the bottom absorbing polarizer;
   and wherein the planar side of the turning film is optically smooth.

10. The display of claim 9, wherein the diffuser is a bulk diffuser.

11. The display of claim 9, wherein the diffuser is a surface diffuser.

12. The display of claim 11, wherein the surface diffuser includes a microreplicated surface.

13. The display of claim 9, wherein the diffuser has at least 35% haze.

14. The display of claim 9, wherein the diffuser has at least 70% haze.

15. The display of claim 9, wherein the diffuser has at least 80% haze.

16. The display of claim 9, wherein the diffuser is laminated to the top absorbing polarizer.

17. A switchable display, comprising the display of claim 9.

* * * * *